(12) United States Patent
Baratakke et al.

(10) Patent No.: US 8,266,324 B2
(45) Date of Patent: Sep. 11, 2012

(54) DOMAIN SPECIFIC DOMAIN NAME SERVICE

(75) Inventors: Kavitha V. M. Baratakke, Austin, TX (US); Jagdish C. Gopalakrishnan, Karnataka (IN); Nikhil Hegde, Round Rock, TX (US); Prithvi Srihari, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 12/138,126

(22) Filed: Jun. 12, 2008

(65) Prior Publication Data

US 2009/0313384 A1 Dec. 17, 2009

(51) Int. Cl.
*G06F 15/16* (2006.01)
(52) U.S. Cl. .................................. 709/245; 709/203
(58) Field of Classification Search .............. 709/245
See application file for complete search history.

(56) References Cited

U.S. PATENT DOCUMENTS

| | | | | |
|---|---|---|---|---|
| 6,795,858 | B1* | 9/2004 | Jain et al. ...................... | 709/226 |
| 7,246,133 | B2 | 7/2007 | Velasco et al. | |
| 2002/0099814 | A1 | 7/2002 | Mastrianni | |
| 2003/0051042 | A1* | 3/2003 | Tazoe .............................. | 709/229 |
| 2003/0191822 | A1* | 10/2003 | Leighton et al. .............. | 709/219 |
| 2004/0199510 | A1 | 10/2004 | Bustillo Velasco et al. | |
| 2004/0215823 | A1 | 10/2004 | Kleinfelter et al. | |
| 2007/0061485 | A1 | 3/2007 | Horton et al. | |
| 2008/0144625 | A1* | 6/2008 | Wu et al. ........................ | 370/392 |
| 2009/0031028 | A1* | 1/2009 | Kumar et al. .................. | 709/227 |

OTHER PUBLICATIONS

HowStuffWork.com—How Domain Name Servers Work, Author: Marshall Brain, Published: Nov., 11, 2001 http://web.archive.org/web/20011117203752/www.howstuffworks.com/dns.htm/printable.*
The etc hosts file, Author: Linux RedHat, Securing and Optimizing Linux: RedHat Edition—A Hands on Guide, Published: Aug. 17, 2003 http://web.archive.org/web/20030817131324/www.faqs.org/docs/securing/chap9sec95.html.*
P. Mockapetris; Domain Names; Network Working Group; Nov. 1983.
R. Draves; Default Address Selection for Internet Protocol version 6; Network Working Group; Feb. 2003.
M. Bagnulo; Updating RFC 3484; Network Working Group; Dec. 2005.
C. Liu; DNS & Bind Cookbook; Oct. 2002; Chapter 9.5; O'Reilly & Associates, Inc. pp. 172, 174, 175.

* cited by examiner

*Primary Examiner* — Benjamin R Bruckart
*Assistant Examiner* — Noel Beharry
(74) *Attorney, Agent, or Firm* — Robert C. Rolnik; David A. Mims (57) ABSTRACT

The present invention provides a computer implemented method for resolving a universal resource identifier (URI). The client computer receives the universal resource identifier, which is comprised of a domain name. The client computer looks up a row corresponding to the domain name in a domain specific domain name service (DNS) server list. The row includes at least a first internet protocol address. The client computer transmits a domain name service (DNS) query addressed to the first internet protocol address responsive to looking up the row. Upon receiving a valid response in at least one packet, wherein the at least one packet is from the first internet protocol address, the client computer resolves the universal resource identifier to a second internet protocol address.

19 Claims, 3 Drawing Sheets

DOMAIN SPECIFIC DOMAIN NAME SERVICE

BACKGROUND OF THE INVENTION

1. Field of the Invention

The present invention relates generally to a computer implemented method, data processing system, and computer program product for locating a name registry. More specifically, the present invention relates to locating a name registry responsive to a user'sa context or log-in environment.

2. Description of the Related Art

Users of networked computers use a system of internet protocol addresses to route traffic from a computer, for example, a client computer, to a recipient computer, for example, a server. Internet protocol (IP) addresses, as used in Internet Protocol Version 4 (IPv4), use four fields of digits, each from 0-255, to establish the IP address of a computer or other networked device. Such addresses are 32 bits long, and are typically indicated in dotted-octet notation, for example 192.168.0.1. Even longer addresses are anticipated when Internet Protocol Version 6 (IPv6) is implemented. Such IP addresses under the IPv6 scheme have 128 bits to identify each computer or device.

The IP addressing system presents IP addresses that are as many as 12 digits long under the current system. To simplify user access to servers across the internet, the domain name service (DNS) was created. In essence, DNS is administered by providing DNS servers that provide tables that match an IP address to a textual address that includes letters. Accordingly, simple domain names have been made possible for use in advertising to encourage people to later surf to websites hosted at IP addresses. Some examples of domain names include ibm.com, google.com, his.ph, del.icio.us, among others. As can be seen, relatively few characters can be used at a browser, or in other contexts, and a DNS server does the mentally taxing work of locating the applicable server IP address associated with the given domain name.

Private networks can host a number of servers. For organizations with tens of thousands of employees, such servers may be private, in that the administrating organization chooses not to publish a universal resource identifier'sa (URI) correspondence to the IP address of the server. As a result, a public DNS server would not necessarily have a table entry or row that provides an IP address to the given private URI. Thus, a user of such an URI cannot reach the private URI without either a) entering the IP address directly to a browser address field; or b) changing the DNS server that, by default, is used by a browser to resolve IP addresses. In other words, a typical arrangement of a primary DNS server and a secondary DNS server can fail to resolve a privately hosted URI.

SUMMARY OF THE INVENTION

The present invention provides a computer implemented method for resolving a universal resource identifier (URI). The client computer receives the universal resource identifier, which is comprised of a domain name. The client computer looks up a row corresponding to the domain name in a domain specific domain name service (DNS) server list. The row includes at least a first internet protocol address. The client computer transmits a domain name service (DNS) query addressed to the first internet protocol address responsive to looking up the row. Upon receiving a valid response in at least one packet, wherein the at least one packet is from the first internet protocol address, the client computer resolves the universal resource identifier to a second internet protocol address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
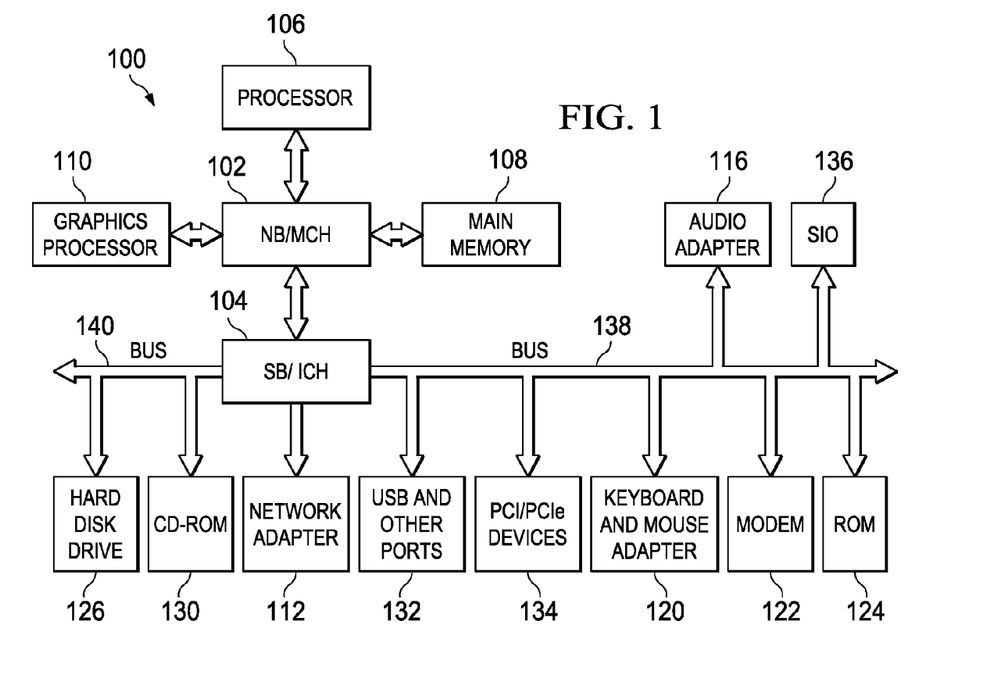
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user'sa computer, partly on the user'sa computer, as a stand-alone software package, partly on the user'sa computer and partly on a remote computer or entirely on the remote computer or server. In the latter scenario, the remote computer may be connected to the user'sa computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for locating a domain specific domain name service (DNS) server. Accordingly, a user that reaches a private network can resolve URIs that correspond to IP addresses in the private network. Accordingly, itinerant knowledge workers may have an automatic means to resolve URIs when attaching a laptop or other mobile device to a private network.

Figure 2A:
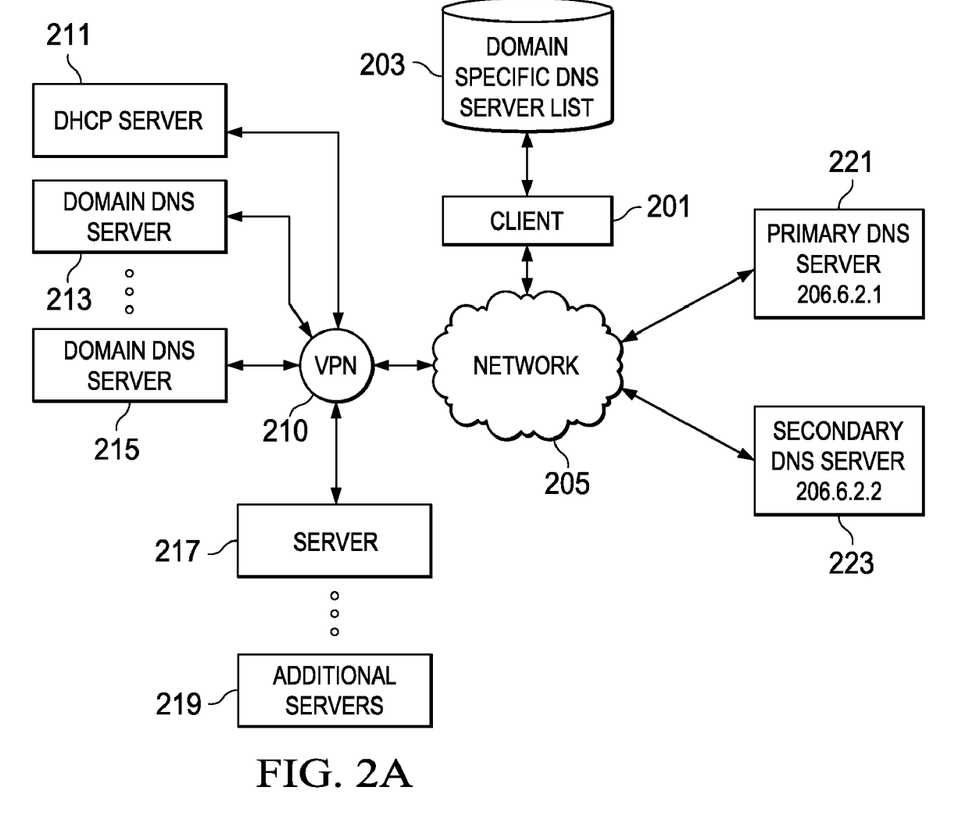
FIG. 2A is a network attached to a private network in accordance with an illustrative embodiment of the invention.

FIG. 2A is a network attached to a private network in accordance with an illustrative embodiment of the invention. Client computer 201 is a computer that resolves a universal resource identifier (URI) and other strings that correspond to domain names. The client computer may be the data processing system 100 of FIG. 1. For example, the client computer can be a computer hosting a browser, a WWW server, and the like. In response to an activity or process that requires a resource that purports to have an IP address, client computer 201 makes DNS queries over network 205 in an attempt to resolve the IP address that corresponds to a receiving a string that includes a domain name. Client computer 201 relies on domain specific DNS server list 230 to identify one or more DNS servers that can attempt to resolve the IP address.

Specifically, a domain specific DNS server list is a data structure that has two or more rows or entries. Each row, except for one, may associates a domain name to one or more IP addresses. Accordingly, a row is a data structure that is used to lookup information associated with a domain name, or to look up a general purpose DNS server where no row matches a domain name. Such information can include one or more IP addresses. Each IP address may be separated by a delimiter or arranged in any other manner conducive to looking up distinct IP addresses associated with the domain name. In addition, each IP address may correspond to a DNS server. It is appreciated that other data structures can be used as rows, for example, linked lists, trees, among other structures that relate a list to a term that is used as a key.

Returning to FIG. 2A, client computer 201 may transmit a DNS query to one or more DNS servers in an attempt to resolve an applicable IP address associated with the domain name. DNS servers include, for example, general purpose DNS servers such as primary DNS server 221 and secondary DNS server 223. These DNS servers respond to DNS queries directed to IP addresses 206.6.2.1 and 206.6.2.2, respectively. In addition, under some circumstances, client computer 201 may transmit DNS queries to domain DNS server 213.

A DNS query is a packet or other message transmitted to an IP address associated with a DNS server. The packet contains a domain name. The domain name may be a string within a larger URI. The DNS query may be directed at a domain DNS server, for example, domain DNS server 213 behind or within a domain controlled by a virtual private network device 210. Virtual private network (VPN) device 210 can be a firewall. Further domain DNS servers may also be provided as backups to a primary domain DNS server. Such secondary DNS servers may include domain DNS server 215.

About the time that client computer 201 logs in to VPN device 210, dynamic host configuration protocol (DHCP) server 211 may assign an IP address to client. Such an IP address may be the IP address that VPN device 210 uses to forward inbound packets destined for client computer 201. Additional features may be provided by DHCP server 211, as explained further below.

Client computer 201 may communicate further with server 217 and additional servers 219 in response to successfully resolving an IP address associated with server 217 and additional servers 219. Such a communication may be facilitated by obtaining a second internet protocol address subsequently to obtaining the IP address of a DNS server capable of providing the second IP address.

Figure 2B:
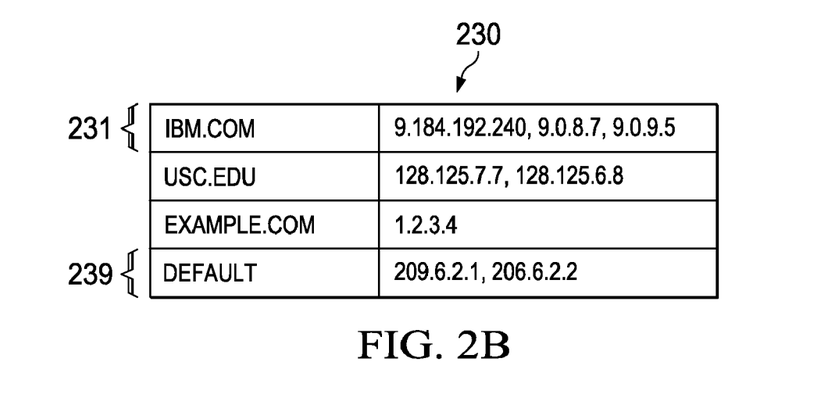
FIG. 2B is an exemplary domain specific DNS server list in accordance with an illustrative embodiment of the invention.

FIG. 2B is an exemplary domain specific DNS server list in accordance with an illustrative embodiment of the invention. Domain specific DNS server list 230 is an example of a data structure that can be used to supply an IP address related to a domain name. Domain specific DNS server list 230 is made up of several rows including row 231 and row 239. Row 231 has a key of ibm.com, while row 239 has a key of default.

Row 239 represents a second class of row. This class of row is called a general purpose row. A general purpose row is a row that has only IP addresses that correspond to general purpose DNS servers. It is appreciated that IP addresses for a general purpose DNS server may appear in row 239 and be referenced by any key that denotes a default or general purpose nature of the row. Accordingly, the key to row 239 may be blank, or carry any placeholder. In any event, the general purpose row does not correspond to any single domain name.

The use of domain specific DNS server lists such as domain specific DNS server list 230 can provide the basis for a obtaining a valid response when using a DNS server. Since the domain specific DNS server list includes at least one IP address for a domain specific DNS server, a larger set of domain names may be resolved by DNS servers in the domain specific DNS server list. That is, the set is larger as compared to the set of domain names that may be resolved by general purpose DNS servers as may appear in a general purpose row alone. Thus, domain specific DNS server list 230 may help to identify a DNS server capable of resolving and/or retrieving IP address associated with a domain name and even subdomains of a domain name.

When a DNS server successfully resolves a URI to an IP address, it sends a valid response. A valid response is a payload stored and/or transmitted in one or more packets that are received by a client computer in a predetermined time. The predetermined time is a time that is measured from the transmittal of the DNS query. Accordingly, a response received after the predetermined time expires is not considered a valid response.

A default DNS server row is a row where a key in the form of a domain name is absent. In other words, a default DNS server row is a row that associates a default DNS server with a condition that no matches are found among the other rows of a domain specific DNS server lists. In the example of FIG. 2B, the default DNS server row is row 239. It is appreciated that row 239 may be a row that is relied on as a last resort to being unable to find a domain name in the other rows of domain specific DNS server list 230. Accordingly, row 239 may be referenced by any suitable key that denotes a default entry, even, for example, an empty string in place of a key. The purpose of a default DNS server row such as row 239 is to supply one or more IP addresses for DNS servers that are general purpose in nature.

A default DNS server is a general purpose DNS server. A general purpose DNS server is a DNS server that is not, while in normal DNS processing mode, restricted from responding to queries based on the identity of the client computer that seeks to resolve a domain name. Such general purpose DNS servers can be reached by referencing an IP address accessible over the internet and usually do not contain IP addresses for servers located within private intranets.

Figure 3:
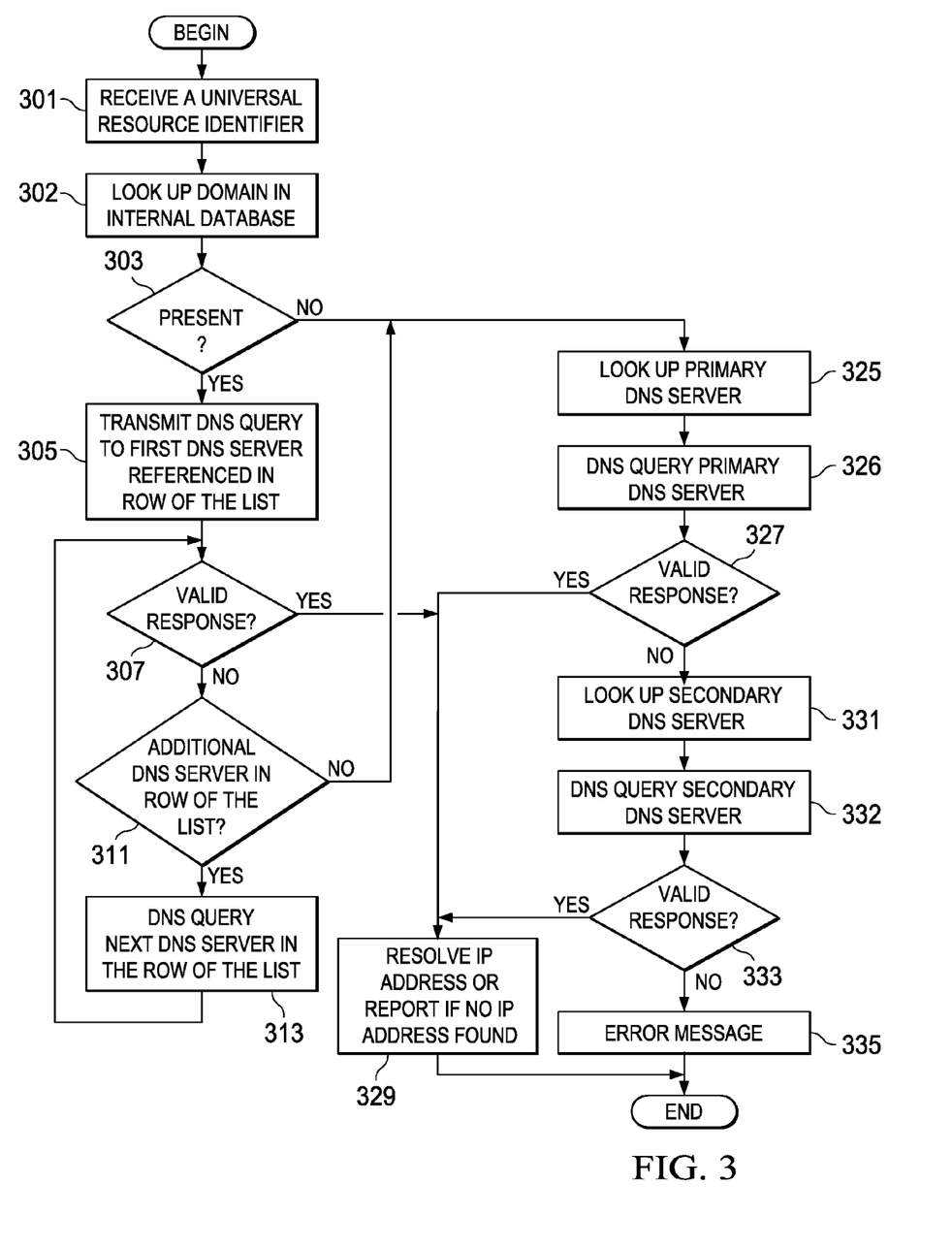
FIG. 3 is a process for resolving an internet protocol address in accordance with an illustrative embodiment of the invention.

FIG. 3 is a process for resolving an internet protocol address in accordance with an illustrative embodiment of the invention. Initially, a client computer receives a universal resource identifier (URI) (step 301). As described above, the URI is a string that contains a domain name. Next, the client computer looks up the domain name in an internal database (step 302). The internal database can be domain specific DNS server list 230 of FIG. 2.

Next, the client computer can determine whether the domain name is present in the domain specific DNS server list (step 303). If the domain name is found in a row, the domain name will have an internet protocol address associated with the domain name. Such an internet protocol address can be associated with a DNS server. Accordingly, the client computer may transmit a DNS query to the first DNS server referenced in the row of the list (step 305).

Next, the client computer may determine if a valid response has been received from the first DNS server (step 307). If a valid response has been received, the client computer may resolve an IP address or report if no IP address was found by the DNS server (step 329).

However, if the client computer determined no valid response was received at step 307, the client computer may determine if an additional or second DNS server is present in the row of the list (step 311). If an additional DNS server is present, the client computer transmits a DNS query to the next DNS server (step 313). Processing continues at step 307.

Step 307 determines if a valid response was received to a DNS query. A valid response is a properly formed packet or packets that arrive within a timeout period. A properly formed packet is a packet that, by itself, or with associated packets that respond to the query, include a list of IP addresses for the domain name; an authoritative name server for the domain name; and a name of the mail server, if any, for the domain name.

An alternative outcome to step 311 is a determination that no additional DNS servers are present in the list. This determination is made after all DNS servers in the row are exhausted. The DNS servers are exhausted after all DNS queries made to such DNS servers have been attempted. Accordingly, the client computer next looks up a primary DNS server (step 325). Step 325 is also performed in response to a negative result to step 303.

Looking up a primary DNS server involves reading the default DNS server row and selecting a first IP address found on that row. Next, the client computer performs a DNS query on the primary DNS server (step 326). A determination is made if the primary DNS server made a valid response (step 327). In response to a negative response, the client computer may look up a secondary DNS server (step 331). Next, the client computer may perform a DNS query on the secondary DNS server (step 332).

Next, the client computer determines if the secondary server made a valid response (step 333). As a consequence of a negative result to step 333, the client computer produces an error message (step 335). A negative result happens, for example, when either an invalidly formed packet is received from the server, or the responsive packets fail to arrive at the client computer within a reasonable timeout period after the DNS query. Under either result, the DNS server is considered unreachable. The error message can be a signal sent to an application that initially sent the URI to or through the client computer. Alternatively, the error message can be a user readable message presented to a user by way of a peripheral device of the client computer. User readable messages include, for example, "Server not found." Processing terminates thereafter.

A valid response at steps 327 or 333 results in the client computer resolving an IP address or reporting if no IP address was found by the DNS server (step 329). Processing terminates thereafter.

Figure 4A:
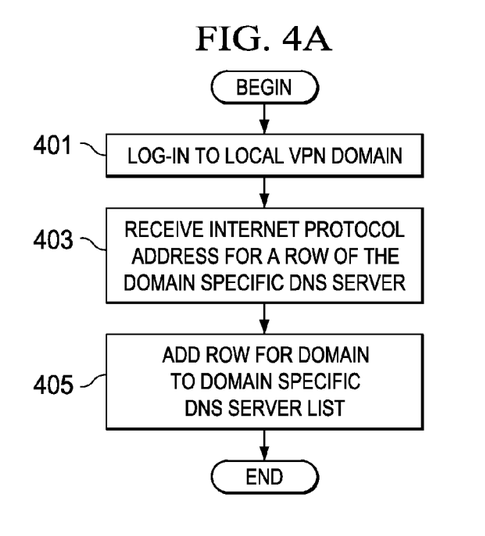
FIG. 4A is a process for updating a domain specific DNS server list in accordance with an illustrative embodiment of the invention.

FIG. 4A is a process for updating a domain specific DNS server list in accordance with an illustrative embodiment of the invention. Such a process can be used as a set of initial steps to populate a domain specific DNS server list. Accordingly, the process of FIG. 4A may serve as a basis for performing the method shown in FIG. 3.

Initially, a client computer logs in to a private domain (step 401). A private domain is a network of one or more computers accessible as a sub-network. Such a domain is usually not reachable from the Internet without authentication. Such a log-in may establish an authenticated session. An authenticated session is a state that a client computer reaches with one or more computers of a host network. The state is reached after an exchange of credentials to identify the client computer as having permission to access resources of the private network or private domain. The log-in may be from within a private network. For example, the client computer may attach to an unused port on the private network. Alternatively, the log-in may be from a node that is logically outside the private domain's a network, for example, as may be accomplished using a virtual private network.

Next, the client computer receives the first internet protocol address for a row of the domain specific DNS server (step 403). The client computer can receive the first internet protocol address as a row having one or more internet protocol addresses as described in relation to FIG. 2B. Step 403 may be performed by receiving the first protocol address from a dynamic host configuration protocol (DHCP) server in response to the logging in step 401. A dynamic host configuration protocol (DHCP) server is a device that provides an IP address and other configuration details to a device added to a computer network. In addition, the client computer may add a row corresponding to the domain name to the domain specific DNS server list (step 405). Processing terminates thereafter.

Figure 4B:
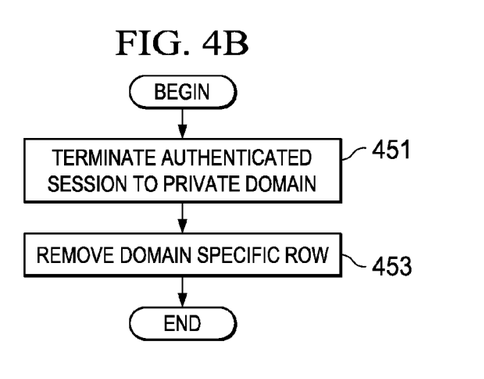
FIG. 4B is a process for removing a row from a domain specific DNS server list in accordance with an illustrative embodiment of the invention.

FIG. 4B is a process for removing a row from a domain specific DNS server list in accordance with an illustrative embodiment of the invention. Initially, the client computer may terminate an authenticated session to the private domain (step 451). Terminating an authenticated session may occur in several manners. First, the client computer may detect a failure of the network medium to transmit signals. Such an event may occur after a cable break or a problem with a wireless path. Second, the client computer may log off from the private network. Next, the client computer may remove a domain specific row associated with the private network (step 453). Processing terminates thereafter.

The illustrative embodiments permit a client computer to be able to resolve IP addresses when the client computer joins a private domain. In addition, the client computer may obtain a resolved IP address by relying on a DNS server that has a more compact data structure than a general purpose DNS server.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for resolving a universal resource identifier (URI) comprising:
a mobile device logging in to a private domain;
the mobile device adding a row corresponding to a domain to a domain specific domain name service (DNS) server list in response to logging in;
receiving by a mobile device the universal resource identifier, the universal resource identifier comprising a domain name;
looking up a row, by the mobile device, wherein the row corresponds to the domain name in a domain specific domain name service (DNS) server list, the row comprising a first internet protocol address, the domain specific domain name service (DNS) server list comprising the row and a general purpose row, wherein the general purpose row does not correspond to any single domain name, wherein the general purpose row is a row that has only Internet protocol addresses that correspond to general purpose DNS servers, wherein the domain specific domain name service (DNS) server list is internal to the mobile device, and wherein the domain specific domain name service (DNS) server list comprises at least one Internet protocol address for a domain specific DNS server;
transmitting, from the mobile device, a domain name service (DNS) query addressed to the first internet protocol address responsive to looking up the row;
receiving, at the mobile device, a valid response in at least one packet, wherein the at least one packet is from the first internet protocol address; and
resolving, by the mobile device, the universal resource identifier to a second internet protocol address.

2. The computer implemented method of claim 1, wherein looking up comprises:
looking up a row based on a second level domain name, wherein the second level domain is present in a row of the domain specific domain name service server list.

3. The computer implemented method of claim 1, wherein the row contains the first internet protocol address, and the first internet protocol address is not present in a default domain name service (DNS) server row.

4. The computer implemented method of claim 1, wherein resolving comprises:
receiving the second internet protocol address from a device corresponding to the first internet protocol address; and transmitting an internet request addressed to a second device corresponding to the second internet protocol address.

5. The computer implemented method of claim 1, wherein a valid response comprises:
receiving a packet containing the second internet address within a predetermined time after transmitting the domain name service (DNS) query.

6. The computer implemented method of claim 1, further comprising:
terminating an authenticated session to the private domain; and
removing the row corresponding to the private domain from the domain specific domain name service (DNS) server list in response to terminating.

7. The computer implemented method of claim 1, wherein adding comprises:
receiving the first internet protocol address from a dynamic host configuration protocol (DHCP) server in response to logging in.

8. A computer program product for resolving a universal resource identifier (URI) the computer program product comprising:
a computer-usable, storage device having computer-usable program code embodied therewith, the computer program product comprising:
computer-usable program code configured to log in to a private domain;
computer-usable program code configured to add a row corresponding to a domain to a domain specific domain name service (DNS) server list in response to logging in;
computer-usable program code configured to receive by a mobile device the universal resource identifier, the universal resource identifier comprising a domain name;
computer-usable program code configured to look up a row, by the mobile device, wherein the row corresponds to the domain name in a domain specific domain name service (DNS) server list, the row comprising a first internet protocol address, the domain specific domain name service (DNS) server list comprising the row and a general purpose row, wherein the general purpose row does not correspond to any single domain name, wherein the general purpose row is a row that has only Internet protocol addresses that correspond to general purpose DNS servers, wherein the domain specific domain name service (DNS) server list is internal to the mobile device, and wherein the domain specific domain name service (DNS) server list comprises at least one Internet protocol address for a domain specific DNS server;
computer-usable program code configured to transmit, from the mobile device, a domain name service (DNS) query addressed to the first internet protocol address responsive to looking up the row;
computer-usable program code configured to receive, at the mobile device, a valid response in at least one packet, wherein the at least one packet is from the first internet protocol address; and
computer-usable program code configured to resolve, by the mobile device, the universal resource identifier to a second internet protocol address.

9. The computer program product of claim 8, wherein computer usable code to look up comprises:
computer usable program code configured to look up a row based on a second level domain name, wherein the second level domain name is present in a row of the domain specific domain name service server list.

10. The computer program product of claim 8, wherein the row contains the first internet protocol address and the first internet protocol address is not present in a default domain name service (DNS) server row.

11. The computer program product of claim 8, wherein computer usable program configured to resolve comprises:
computer usable program code configured to receive the second internet protocol address from a device corresponding to the first internet protocol address; and
computer usable program code configured to transmit an internet request addressed to a second device corresponding to the second internet protocol address.

12. The computer program product of claim 8, wherein computer usable program code configured to receive a valid response comprises:
computer usable program code configured to receive a packet containing the second internet address within a predetermined time after transmitting the domain name service (DNS) query.

13. The computer program product of claim 8, wherein computer program product further comprises:
computer-usable program code configured to terminate an authenticated session to the private domain; and
computer-usable program code configured to remove the row corresponding to the private domain from the domain specific domain name service (DNS) server list in response to terminating.

14. The computer program product of claim 8, wherein computer-usable program code configured to add comprises:
computer-usable program code configured to receive the first internet protocol address from a dynamic host configuration protocol (DHCP) server in response to logging in.

15. A data processing system in a mobile device comprising:
a bus;
a storage device connected to the bus, wherein computer usable code is located in the storage device;
a communication unit connected to the bus; and
a processing unit connected to the bus, wherein the processing unit executes the computer-usable code for resolving a universal resource identifier (URI), wherein the processing unit executes the computer-usable program code to log in to a private domain; add a row corresponding to a domain to a domain specific domain name service (DNS) server list in response to logging in; receive by the mobile device the universal resource identifier, the universal resource identifier comprising a domain name; look up a row corresponding to the domain name in a domain specific domain name service (DNS) server list, the row comprising a first internet protocol address, the domain specific domain name service (DNS) server list comprising the row and a general purpose row, wherein the general purpose row does not correspond to any single domain name, wherein the general purpose row is a row that has only Internet protocol addresses that correspond to general purpose DNS servers, wherein the domain specific domain name service (DNS) server list is internal to the mobile device, and wherein the domain specific domain name service (DNS) server list comprises at least one Internet protocol address for a domain specific DNS server; transmit a domain name service (DNS) query addressed to the first internet protocol address responsive to looking up the row; receive a valid response in at least one packet, wherein the at least one packet is from the first internet protocol address; and resolve, by the mobile device, the universal resource identifier to a second internet protocol address.

16. The data processing system of claim 15, wherein in executing computer usable code to look up, the processing unit executes computer usable code to look up a row based on a second level domain name, wherein the second level domain name is present in a row of the domain specific domain name service server list.

17. The data processing system of claim 15, wherein the row contains the first internet protocol address and the first internet protocol address is not present in a default domain name service (DNS) server row.

18. The data processing system of claim 15, wherein in executing computer usable code to resolve, the processing unit executes computer usable code to receive the second internet protocol address from a device corresponding to the first internet protocol address; and
transmit an internet request addressed to a second device corresponding to the second internet protocol address.

19. A data processing system for resolving a universal resource identifier (URI) comprising:
a means for logging in to a private domain;
a means for adding a row corresponding to a domain specific domain name service (DNS) server list in response to logging in;
a means for receiving the universal resource identifier, the universal resource identifier comprising a domain name;
a means for looking up a row wherein the row corresponds to the domain name in a domain specific domain name service (DNS) server list, the row comprising a first internet protocol address, the domain specific domain name service (DNS) server list comprising the row and a general purpose row, wherein the general purpose row does not correspond to any single domain name, wherein the general purpose row is a row that has only Internet protocol addresses that correspond to general purpose DNS servers, wherein the domain specific domain name service (DNS) server list is internal to the mobile device, and wherein the domain specific domain name service (DNS) server list comprises at least one Internet protocol address for a domain specific DNS server;
a means for transmitting a domain name service (DNS) query addressed to the first internet protocol address responsive to looking up the row;
a means for receiving a valid response in at least one packet, wherein the at least one packet is from the first internet protocol address; and
a means for resolving the universal resource identifier to a second internet protocol address.

* * * * *